US005840393A

United States Patent [19]

Gannon

[11] Patent Number: 5,840,393

[45] Date of Patent: Nov. 24, 1998

[54] PRINTABLE FLEXIBLE SHEET

[75] Inventor: Raymond Peter Gannon, St. Lucia, Australia

[73] Assignee: The University of Queensland, Queensland, Australia

[21] Appl. No.: 793,945

[22] PCT Filed: Sep. 6, 1995

[86] PCT No.: PCT/AU95/00579

§ 371 Date: Mar. 4, 1997

§ 102(e) Date: Mar. 4, 1997

[87] PCT Pub. No.: WO96/07551

PCT Pub. Date: Mar. 14, 1996

[30] Foreign Application Priority Data

Sep. 6, 1994 [AU] Australia ................................ PM7879

[51] Int. Cl.[6] ........................................................ B32B 3/14

[52] U.S. Cl. ............................ 428/49; 428/143; 428/195; 428/404; 428/426; 428/452; 156/212

[58] Field of Search ................................ 428/195, 411.1, 428/688, 49, 143, 426, 404, 452, 913, 914; 156/212

[56] References Cited

U.S. PATENT DOCUMENTS

| | | | |
|---|---|---|---|
| 2,970,076 | 1/1961 | Porth | 154/99 |
| 3,007,825 | 11/1961 | Cubberley | 154/60 |
| 3,894,167 | 7/1975 | Kluge et al. | 428/40 |
| 4,383,890 | 5/1983 | Oshima et al. . | |

FOREIGN PATENT DOCUMENTS

| | | |
|---|---|---|
| 61117/73 | 4/1975 | Australia . |
| 22993/77 | 9/1978 | Australia . |
| 11646/83 | 2/1983 | Australia . |
| 86714/91 | 4/1992 | Australia . |
| 3110565 | 2/1982 | Germany . |
| 91-077342/11 | 1/1991 | Japan . |
| 92-118293/15 | 2/1992 | Japan . |
| 961637 | 6/1964 | United Kingdom . |
| 2245221 | 1/1992 | United Kingdom . |

*Primary Examiner*—Elizabeth Evans
*Attorney, Agent, or Firm*—Nixon & Vanderhye P.C.

[57] ABSTRACT

The present invention relates to a printable flexible sheet comprising heat fusible particles and a carrier phase for said particles. The present invention also relates to a method of modifying a heat fusible surface in which the printable flexible sheet is printed with ink, applied to the surface of the substrate. The substrate is then heated such that at least some of the particles and some of the ink fuses to the surface of the substrate.

14 Claims, No Drawings

PRINTABLE FLEXIBLE SHEET

FIELD OF THE INVENTION

THIS INVENTION relates to a printable flexible sheet and particularly to a sheet containing components to provide it with sufficient paper-like qualities such as flexibility and printability but which sheet can be subsequently heated to fuse it to a substrate, such as glass or ceramic.

BACKGROUND ART

Printing or otherwise applying decorative and/or functional designs to a glass or ceramic substrate finds innumerable practical applications. The applications include preparation of coloured sheet glass, artificial stained glass, tableware, framed glass pictures and tinted glass. The print to be applied to the glass can be purely decorative but can also have functional properties such as reflectivity and opacity.

It is known to apply prints directly to rigid glass panes using screen printing, or even by hand painting. If ceramic-type pigments are used, the painted or printed glass pane can be subject to heat treatment to fuse the pigments to the glass. There are many disadvantages with the above techniques. Firstly, hand painting is time-consuming, requires a great deal of skill and does not lend itself to mass production. Also, hand painting does not allow identical patterns to be reproduced. Screen printing allows some degree of reproducability, but requires the glass plate to be held in a horizontal position as the print is applied. For large sheets, this requires expensive manufacturing equipment. Another disadvantage with the direct application of inks to glass is that fine resolution is not available for a number of reasons, including spreading of the ink on the glass surface. Glass and ceramic substrates do not absorb inks into their structure so any application of ink is purely a surface effect rather due to absorption of the ink into the substrate itself. Thus, this type of printing or painting does not lend itself to high quality decorative or functional designs. Another disadvantage is that the painted or printed glass pane must be more of less immediately fired to fuse the ink to the sheet, and cannot be stored or stacked without damage or smudging of the print.

It is also known to use sputtering principles, vacuum vapour evaporation, dip and spray coating techniques to coat glass panes with reflective or colouring elements. Each of these requires complicated and costly equipment, large floor areas to accommodate the equipment and does not generally lend itself to applying prints to only certain areas of the glass. The above techniques provide a layer of the desired product on the surface of the glass or ceramic substrate. Penetration of the coating into the substrate is negligible (eg. about 0.01–0.005 $\mu$m).

Some of the abovementioned disadvantages have been overcome by using a printed plastic film. The film can be pre-printed using known printing techniques and can be stuck onto the glass or other substrate. A disadvantage with plastic films is that they cannot be fired to fuse the ink onto the glass or other substrate. Instead, the ink remains within the film. As the plastic film is relatively soft, it is susceptible to scratching or dulling. Application of the film requires care to avoid formation of air bubbles. Many plastic films are not resistant to UV degradation, are not heat resistant, and do not have optical properties making them suitable for window glass. Thus, plastic films attached to glass panes only find limited uses.

It is known to apply a plastic print or decal to a glass or ceramic surface and to subsequently coat it with a glaze prior to firing. The glaze hardens and provides a scratch-resistant surface over the plastic print. While this overcomes some of the disadvantages of an exposed plastic film, there are additional steps required to provide a glaze, and the plastic print can yellow, curl or carbonise during the firing step.

The present invention is directed to a flexible sheet which can be printed on with high definition, which can have desirable paper qualities of flexibility, ability to be stored on a roll, and which when applied to a substrate, can be fired to fuse the print to the substrate.

It is an object of the invention to provide a sheet which may overcome the abovementioned disadvantages or provide the consumer with a useful or commercial choice.

SUMMARY OF THE INVENTION

In one form, the invention resides in a printable flexible sheet comprising heat fusible particles and a carrier phase for said particles.

The sheet can have the twin advantages of "paper" type qualities of flexibility, ability to be handled and stored on a roll, and printability, together with glass qualities of being fusible to a substrate, such as a glass plane.

By having the "paper" type qualities, a high print resolution can be obtained, thereby allowing intricate decorative and/or functional designs to be printed or otherwise applied to the sheet. It is preferred that the sheet includes absorption or adsorption qualities to allow the ink to be absorbed or adsorbed into or onto the sheet to allow the printed sheet to be handled without appreciable smudging. In this manner the ink can penetrate into the sheet thus allowing the ink components to be more securely localised on or in the sheet.

The sheet, either in an unprinted or printed form, can be stored for future use, and can be cut and sized to shape. The sheet can be placed onto a substrate, such as a glass or ceramic object, and subjected to heat treatment. The heat treatment can fuse the glass particles and some of the ink components to the substrate. It is preferred that the carrier phase which provides flexibility and printability can substantially volatise or does not leave an appreciable undesirable residue during the heating step.

Preferably, the fusible particles are glass particles and these may be in the form of powdered glass. Glass frit may be a suitable source of glass particles. The glass particles may comprise or include chopped glass fibres. The particle size and shape can vary to suit the process of forming the glass sheet, and the use of the glass sheet. In cases where the fused particles may be required to provide some structural integrity such as in the shaped article described below, chopped fibres or a combination of fibres and frits may be used. The fusible particles may comprise glass precursor compounds which, upon heating, will fuse into a glass. These precursor compounds (or glass batch materials) may include calcium carbonates, aluminium oxides and sulphates, and silicon oxides.

The carrier phase preferably comprises one or more components. Typically, components are those used in paper manufacture. These components may include starch, cellulose and silica. A binder may be present to provide flexibility and tear resistance to the sheet. Additional components may be used to provide improved printability, flexibility, tear resistance, anti-yellowing properties, and the like, to the sheet.

The amount of the one or more components is preferably kept to a minimum as it is desirable that the or each component is subsequently removed during heating of the sheet. For components that can be easily removed, for instance, by volatisation, a larger amount of the components may be present. Conversely, for components which are not easily removed or which may leave a residue during heating, it is desirable to keep such components to a minimum or to eliminate the components altogether. The choice and amount of the components would be apparent to a person skilled in the art without requiring undue experimentation.

The sheet can be formed by addition of glass particles to a pulp, or by adding the glass particles to an already prepared carrier paper. In this latter form the glass particles may be incorporated into a binder such as polyvinylacetate, a cellulose colloid and the like.

The sheet may be printed in a conventional manner, such as by screen printing, or other applications. A good print resolution can be observed relative to printing directly onto glass. The inks may of course also be applied to the sheet by hand. The ink components are those which can be subjected to heat treatment and these may include known ceramic dyes and pigments such as metal oxides of nickle, cobalt and copper oxides or mixtures thereof. These can be dispersed in a binder or a liquid medium in a known manner, and it is preferred that the binder or liquid medium is one which volatises upon heating.

Alternatively, the ink may form one of the one or more components. A sheet prepared in this manner will impart a uniform colour over the whole surface to which it has been applied. Such a sheet may be cut to a shape before application.

The sheet material can be formed by following or adapting general paper-making techniques. Thus, glass particles can be added to a paper pulp with the pulp being subsequently applied to a porous screen and subjected to the usual drying and rolling steps to form the flexible glass sheet.

Alternatively, glass particles may be added to a gel which can then be converted to a sheet material by appropriate techniques.

The formed sheet can then be printed, applied to a substrate and subjected to heat treatment to fuse the glass particles and the inks to the substrate. During the heating process, the "paper" components, such as starch and the like, volatise and do not appreciably remain in the fused product.

Although the sheet material can be applied to a substrate and subsequently fired, it is also possible to subject the sheet material, and typically a printed sheet material to a heat treatment step in isolation to form a thin but rigid glass product. The sheet material can be configured prior to firing and will set in the desired configuration. To impart greater strength to the formed rigid glass product, it is envisaged that the amount of glass particles in the sheet material will be increased if the sheet material is to be used in this manner. Alternatively, a number of layers may be used. They may be fired together or sequentially.

DETAILED DESCRIPTION OF THE PREFERRED EMBODIMENT

An example of preparation and printing of a sheet material according to an embodiment of the invention is as follows:

EXAMPLE 1

A lead borosilicate glass matrix is prepared conventionally and ground into a frit. The frit is mixed into a cellulose colloid complex and/or a sol gel. The resultant mixture is processed to form sheet material using a Fourdrinier machine. The machine comprises a means for flowing the cellulose and/or sol gel optionally including fillers onto a moving porous web. Polymerisation and dehydration of the pulp components containing the glass frit is completed using successive gravity drainage, vacuum drainage, felt roll contact and steam heating calendering.

Suitable cellulose fibrils are selected so that they hold glass forming fillers in a uniform matrix during heat treatment processing and either leave no residue or such residue is incorporated in the fused product. Heat treatment temperatures are in the range 480° C.–1200° C., with atmosphere control. A preferred process incorporates many of the functions and equipment used to thermally toughen glass sheets.

A preferred substrate material to which the "paper" is applied, is architectural flat glass with coefficient of thermal expansion $7.9–8.0\times10^{-6}$/cm/°C. A preferred "glass paper" material comprises a material having thermal expansion characteristics within $4.0\times10^{-6}$/cm/°C. of the substrate material. Yet a further preferred embodiment of said prepared "glass paper" comprises vitreous and/or glass/ceramic material having thermal expansion characteristics within $0.4\times10^{-6}$/cm/°C. of the substrate material.

An alternative preferred substrate material is a soda/lime glass such as is available for architectural purposes and is generally produced using the "float glass" process.

While not wishing to be bound by theory, it appears that the glass particles (including precursor components) can cross link or polymerise with the cellulose pulp or sol gel components to form an at least partially stable complex which, in part, assists in keeping the glass particles from settling out of the pulp or gel.

It should be appreciated that many other changes or modifications can be made to the embodiments described without departing from the spirit and scope of the invention.

I claim:

1. A printed flexible sheet which includes at least one printed layer including print, said at least one layer comprising heat fusible particles and a carrier phase for said particles, wherein said said print is at least partially absorbed or adsorbed into said carrier phase, and said carrier phase is able to substantially volatilize upon heating of said printed sheet to about the temperature at which said particles fuse.

2. The sheet according to claim 1, wherein said carrier phases consists of a cellulosic material.

3. The sheet according to claim 1 wherein said particles are selected from the group consisting of glass particles, glass precursors, or a mixture thereof.

4. A method of modifying the surface of a fusible substrate, said method comprising the steps of: (a) applying to the surface a sheet according to claim 1, and (b) heating the fusible substrate so that at least some of the sheet particles fuse to the surface.

5. A method according to claim 4 wherein steps (a) and (b) are practiced using a glass.

6. A substrate having a surface modified by the method of claim 5.

7. A process for preparing a shaped article comprising the steps of: (a) forming the sheet according to claim 1 into a shape, and (b) heating the sheet so that the fusible particles fuse.

8. A shaped article formed by the process according to claim 7.

9. A printable flexible sheet which includes at least one printable layer, said at least one layer comprising heat fusible particles and a carrier phase for said particles, and any print; and wherein said carrier phase substantially volatilizes upon heating of said printable sheet to about the temperature at which said particles fuse.

10. The sheet according to claim 9, wherein said carrier phase comprises cellulosic pulp.

11. The sheet according to claim 9, wherein said sheet consists only of said one layer.

12. A process for preparing the printable sheet according to claim 9, said process comprising the steps of: (a) mixing glass particles with cellulosic pulp; and (b) forming the pulp into the printable sheet.

13. A printable sheet prepared by the process of claim 12.

14. A printable flexible sheet having at least one surface, and consisting essentially of a single layer of a printable cellulosic carrier having heat fusible particles applied to said surface.

* * * * *